United States Patent
Hahn

(10) Patent No.: US 7,714,051 B2
(45) Date of Patent: May 11, 2010

(54) RUBBER COMPOUNDS CONTAINING POLYOXYALKYLENE AMINES

(75) Inventor: Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/462,740

(22) Filed: Aug. 7, 2006

(65) Prior Publication Data

US 2008/0033082 A1  Feb. 7, 2008

(51) Int. Cl.
*C08K 5/17* (2006.01)
*C08K 5/06* (2006.01)
*C08K 5/10* (2006.01)
*C08L 9/00* (2006.01)

(52) U.S. Cl. .............. 524/243; 524/368; 524/366; 524/114; 524/313; 524/318; 524/322; 524/492; 524/571; 524/575

(58) Field of Classification Search ............... 524/368, 524/243, 492, 262, 265, 114; 525/331.9
See application file for complete search history.

(56) References Cited

U.S. PATENT DOCUMENTS

| | | | | |
|---|---|---|---|---|
| 3,714,115 A | * | 1/1973 | Jonnes | 524/552 |
| 4,044,037 A | * | 8/1977 | Mui et al. | 556/427 |
| 4,061,268 A | * | 12/1977 | DeMaster | 238/14 |
| 5,132,348 A | * | 7/1992 | Saito et al. | 524/252 |
| 5,405,897 A | | 4/1995 | Segatta et al. | |
| 5,914,364 A | * | 6/1999 | Cohen et al. | 524/494 |
| 5,939,484 A | | 8/1999 | Araki et al. | |
| 5,985,953 A | * | 11/1999 | Lightsey et al. | 523/212 |
| 6,269,858 B1 | | 8/2001 | Sandstrom | |
| 6,376,587 B1 | | 4/2002 | Ajiro et al. | |
| 6,391,945 B2 | | 5/2002 | Sandstrom | |
| 6,559,209 B1 | | 5/2003 | Araki et al. | |
| 6,794,428 B2 | | 9/2004 | Burrington et al. | |
| 7,285,584 B2 | * | 10/2007 | Hsu et al. | 523/213 |
| 7,300,970 B2 | * | 11/2007 | Durel et al. | 524/493 |
| 2004/0127631 A1 | * | 7/2004 | Kanamori et al. | 524/523 |
| 2004/0249020 A1 | | 12/2004 | Sandstrom et al. | |
| 2005/0176886 A1 | | 8/2005 | Jang et al. | |
| 2005/0176895 A1 | | 8/2005 | Ko et al. | |
| 2007/0072984 A1 | * | 3/2007 | Sandstrom | 524/495 |
| 2008/0269387 A1 | * | 10/2008 | Resendes et al. | 524/186 |

FOREIGN PATENT DOCUMENTS

| | | | |
|---|---|---|---|
| DE | 2 328 158 | * | 1/1974 |
| EP | 1081187 | | 7/2001 |
| EP | 1236766 | | 4/2002 |
| WO | WO03020813 | | 3/2003 |
| WO | WO 2006/063442 A1 | * | 6/2006 |
| WO | WO2006063442 | | 6/2006 |

OTHER PUBLICATIONS

Huntsman Corporation, Technical Bulletin, The Jeffamine Polyetheramines, 2006.
European Search Report, for Application No. 071138192, dated Dec. 18, 2007.

* cited by examiner

*Primary Examiner*—David Wu
*Assistant Examiner*—Rip A. Lee
(74) *Attorney, Agent, or Firm*—Wood, Herron & Evans, L.L.P.

(57) ABSTRACT

The present invention is directed to a rubber compound, such as for use in tires, containing one or more polyoxyalkylene amines, such as to reduce the amount of silane coupling agent conventionally used therein. The presence of the polyoxyalkylene amine(s) allows for the silane coupling agent to be present in a low percent by weight of silica without substantially sacrificing the performance characteristics of the rubber compound. In one embodiment, the rubber compound includes 100 phr of a natural elastomer, a synthetic elastomer, or combinations thereof, no less than about 20 phr silica, a silane coupling agent present in an amount no more than 8% by weight of the silica, and about 2 phr to about 10 phr of at least one polyoxyalkylene amine defined by a primary amino group attached to the terminus of a polyether backbone.

20 Claims, No Drawings

RUBBER COMPOUNDS CONTAINING POLYOXYALKYLENE AMINES

FIELD OF THE INVENTION

The present invention is directed to a rubber compound for use in tires and, more specifically, to rubber compounds containing one or more polyoxyalkylene amines, such as to reduce the amount of silane coupling agent conventionally used therein.

BACKGROUND OF THE INVENTION

Rubber compounds for various tire components (e.g., tire treads) typically contain particulate reinforcing fillers. While traditional methods have used carbon black as filler, silica fillers are becoming more prevalent in tire compounds due to their improved tradeoffs in stiffness, hysteresis, and wet skid resistance. Additionally, silica fillers can reduce the rolling resistance of tires, thereby potentially increasing fuel economy.

To optimize reinforcement properties, reinforcing filler should be capable of being finely divided and homogeneously distributed throughout the elastomeric matrix. While the traditional carbon black filler has both of these capabilities, silica filler tends to agglomerate due to hydrogen bonding between silanol groups on the surface of the silica particles. This agglomeration leads to poor silica dispersion within the elastomeric matrix and tends to yield a rubber compound with undesirable performance characteristics. To minimize this problem, silica can be dispersed by the addition, for example, of a bi-functional silane coupling agent, or a mixture of such agents, that have one moiety (e.g., a silyl group) which reacts with the silanol groups on the surface of the silica particles and another moiety (e.g., a polysulfide group) that binds the silica particles to the elastomer upon vulcanization. Such bi-functional silane coupling agents are known to those having ordinary skill in the art.

Although these silane coupling agents tend to produce adequate dispersion of the silica filler throughout the elastomeric matrix, there are at least two disadvantages when using these agents. First, silane coupling agents are expensive relative to most other rubber compound ingredients. Second, a relatively large amount of the silane coupling agent, sometimes as much as 20% by weight based on the weight of the silica filler, is required to obtain adequate silica dispersion. Together, these two disadvantages substantially increase the cost of the resulting rubber compound used in the tire.

It would therefore be desirable to provide a rubber compound that includes silica filler and a silane coupling agent wherein the amount of silane coupling agent can be reduced without substantially sacrificing the performance characteristics of the rubber compound.

SUMMARY OF THE INVENTION

The present invention provides for a rubber compound, such as for use in tires, containing one or more polyoxyalkylene amines, such as to reduce the amount of silane coupling agent conventionally used therein. The presence of the polyoxyalkylene amine(s) is understood to allow for the silane coupling agent to be present in a low percent by weight of silica, e.g., no more than 8% by weight of the silica, without substantially sacrificing the performance characteristics of the rubber compound.

To this end, the rubber compound includes a vulcanizable elastomer; a silica filler; a silane coupling agent; at least one polyoxyalkylene amine; and, optionally, epoxidized soybean oil.

In one embodiment, the rubber compound includes a natural elastomer, a synthetic elastomer, or combinations thereof; silica; a silane coupling agent; and at least one polyoxyalkylene amine defined by a primary amino group (—$NH_2$) or secondary amino group (—NH—) attached to the terminus of a polyether backbone. In another, embodiment, the polyoxyalkylene amine is defined by a primary amino group attached to the terminus of a polyether backbone. In one example, the polyoxyalkylene amine is selected from a polyoxyalkylene monoamine, diamine, triamine, or combinations thereof. In another example, the polyoxyalkylene amine is a diamine, e.g., $H_2NCH(C_2H_5)CH_2(OCH(C_2H_5)CH_2)_nNH_2$ wherein n is from about 1 to about 30.

In another embodiment, the rubber compound includes 100 phr of a natural elastomer, a synthetic elastomer, or combinations thereof; no less than about 20 phr silica; a silane coupling agent present in an amount no more than 8% by weight of the silica; about 2 phr to about 10 phr of at least one polyoxyalkylene amine defined by a primary amino group attached to the terminus of a polyether backbone; and optionally epoxidized soy bean oil.

Other aspects of the invention include methods of making the rubber compound, such as for use in a tire.

By virtue of the foregoing, there is thus provided a rubber compound that includes silica filler and silane coupling agent wherein the conventional amount of silane coupling agent can be reduced without substantially sacrificing the performance characteristics of the rubber compound.

DETAILED DESCRIPTION

In accordance with the principles of the present invention, in one embodiment, a rubber compound, such as for use in tires, includes at least one vulcanizable elastomer, a silica filler, a silane coupling agent, at least one polyoxyalkylene amine, and, optionally, epoxidized soybean oil.

The elastomer can include a sulfur and/or peroxide vulcanizable natural elastomer, synthetic elastomer, or combinations thereof. In one example, the elastomer is any suitable conjugated diene-based elastomer, such as polybutadiene rubber (including high-cis and high-vinyl), polyisoprene, natural rubber, isoprene-butadiene copolymer, emulsion-polymerized styrene-butadiene rubber, and solution-polymerized styrene-butadiene rubber (including low-, mid-, and high-vinyl). In another example, the conjugated diene-based elastomer is a sulfur-vulcanizable elastomer containing olefinic unsaturation, or a combination of such elastomers.

The silica filler may be any suitable silica or a combination of any such silica. Commonly used siliceous pigments that are used in rubber compounding applications include pyrogenic and precipitated siliceous pigments (silica), as well as precipitated high surface area ("HSA") silica and highly dispersive silica ("HDS"). The precipitated silicas can be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). In one example, the silica is present in the rubber compound in an amount no less than about 20 phr. In another example, the silica is present in an amount of from about 20 phr to about 110 phr. In another example, the silica is present in an amount no less than about 40 phr. In yet another example, the silica may be present in an amount of from about 40 phr to about 80 phr. In yet another embodiment, the silica may be present in an amount of about 65 phr. Additional filler material, e.g., carbon black, and others well known to those having ordinary skill in the art may also be included in the rubber compound in the desired phr.

The silane coupling agent may be any suitable silane coupling agent, such as bis($\omega$-trialkoxyalkylsilyl) polysulfide, $\omega$-mercaptoalkyl-trialkoxysilane, or combination thereof. In one example, the bis-($\omega$-trialkoxysilylalkyl) polysulfide has an average of from about 2 to about 4 connecting sulfur atoms in its polysulfidic bridge. In another example, the bis-($\omega$-trialkoxysilylalkyl) polysulfide has an average of from about 2 to about 2.6 connecting sulfur atoms in its polysuflidic bridge. In yet another example, the bis-($\omega$-trialkoxysilylalkyl)polysulfide has an average of from about 3.3 to about 3.8 connecting sulfur atoms in its polysulfidic bridge. The alkyl group of the silylalkyl moiety of the bis-($\omega$-trialkoxysilylalkyl)polysulfide may be a saturated $C_2$-$C_6$ alkyl group, e.g., a propyl group. In addition, at least one of the alkyl groups of the trialkoxy moiety of the bis-($\omega$-trialkoxysilylalkyl) polysulfide can be an ethyl group and the remaining alkyl groups of the trialkoxy moiety can be independently saturated $C_2$-$C_{18}$ alkyls. In another example, at least two of the alkyl groups of the trialkoxy moiety of the bis-($\omega$-trialkoxysilylalkyl) polysulfide are ethyl groups and the remaining alkyl group of the trialkoxy moiety is independently a saturated $C_3$-$C_{18}$ alkyl. In one example, the bis-($\omega$-trialkoxysilylalkyl) polysulfide coupling agent is bis-3-(triethoxysilylpropyl) tetrasulfide ("TESPD"). In another example, the bis-($\omega$-trialkoxysilylalkyl) Polysulfide coupling agent is bis-3-(triethoxysilylpropyl) tetrasulfide ("TESPT"). The $\omega$mercaptoalkyltrialkoxysilane may have its mercapto moiety blocked from pre-reacting with hydroxyl groups (e.g., silanol groups) contained on the precipitated silica aggregates prior to unblocking the blocked mercapto moiety at an elevated temperature. In one example, the blocked $\omega$-mercaptoalkyl-trialkoxysilane is NXT or NXT-LoV available from GE Silicones of Tarrytown, N.Y.

The silane coupling agent is present in the rubber compound in an amount no greater than 8% by weight of silica. In another example, the silane coupling agent is present in an amount less than about 6% by weight of silica. In yet another example, the silane coupling agent is present in an amount less than about 5% by weight of silica. In still another example, the silane coupling agent is present in an amount less than about 4% by weight of silica.

The polyoxyalkylene amine for use in the rubber compound can include a polyoxyalkylene monoamine, diamine, triamine, or combinations thereof. These compounds are defined by an amino group attached to a terminus of a polyether backbone and, thus, are considered polyether amines. The amino group may be a primary (—$NH_2$) or secondary (—NH—) amino group. In one embodiment, the amino group is a primary amino group. Depending upon whether the polyoxyalkylene amine is a mono-, di-, or triamine, each compound can contain, respectively, one, two, or three amino groups, e.g. primary amino groups, with each group being attached to the terminus of a polyether backbone. Accordingly, one or more polyether backbones may be necessary to accommodate the number of terminal amino groups.

As further discussed below, the polyether backbone(s) is based on, i.e., further defined by, alkylene oxide groups, such as propylene oxide (PO), ethylene oxide (EO), butylene oxide (BO), and mixtures thereof. In mixed structures, the ratios can be any desired ratio. In one example, in a mixed EO/PO structure, the ratio of EO:PO can range from about 1:1 to about 1:50 and vice-versa. As such, the polyoxyalkylene amine may substantially define a polyethylene oxide, polypropylene oxide, and/or a polybutylene oxide. The molecular weights of the polyoxyalkylene amines vary and typically range up to about 5,000.

The polyoxyalkylene amines of the present invention are believed to act as both a dispersion agent for silica and an activator for the silane coupling agent in the rubber compound. As such, the use of the polyoxyalkylene amine(s) allows for the silane coupling agent to be present in a low percent by weight of silica, e.g., less than 8% by weight of silica, without substantially sacrificing the performance characteristics of the rubber compound. Suitable polyoxyalkylene amines include polyoxyalkylene mono-, di-, and triamines commercially available from Huntsman Chemical of The Woodlands, Tex. and sold under the tradename JEFFAMINE®.

The polyoxyalkylene monoamines generally are prepared by reaction of a monohydric initiator, e.g., an alcohol, with ethylene and/or propylene oxide. This reaction is followed by conversion of the resulting terminal hydroxyl group to an amine, thereby providing a polyether backbone, which includes propylene oxide (PO), ethylene oxide (EO), or mixtures thereof, and a terminal amino group, e.g., a terminal primary amino group. It should be understood by one having ordinary skill in the art, however, that any suitable alkylene oxide may be used, e.g., butylene oxide, in synthesizing the polyoxyalkylene monoamine.

In one embodiment, the polyoxyalkylene monoamine may be defined by the following structure, $CH_3O(CH_2CH(R)O)_n CH_2CH(R')NH_2$, where R individually can be H, forming an ethylene oxide unit, or $CH_3$, forming a propylene oxide unit; R' can be H or any alkyl, e.g., $CH_3$; and n can be from about 2 to about 60. In one example, R' is $CH_3$, n is about 9, and the propylene oxide:ethylene oxide ratio within the backbone of the monoamine is about 9:1. One such suitable commercially available polyoxyalkylene monoamine is JEFFAMINE® XTJ-505 (M-600). In another example, R' is $CH_3$, n is about 45, and the propylene oxide:ethylene oxide ratio within the backbone of the monoamine is about 3:19. One such suitable commercially available polyoxyalkylene monoamine is JEFFAMINE® XTJ-506 (M-1000). In yet another example, R' is $CH_3$, n is about 56, and the propylene oxide:ethlylene oxide ratio within the backbone of the monoamine is about 29:5. One such suitable commercially available polyoxyalkylene monoamine is JEFFAMINE® XTJ-507 (M-2005). In still another example, R' is $CH_3$, n is about 47, and the propylene oxide:ethylene oxide ratio within the backbone of the monoamine is about 10:32. One such suitable commercially available polyoxyalkylene monoamine is JEFFAMINE® M-2070. The molecular weight of each JEFFAMINE® product discussed above is designated after the "M-" such that, for example, the molecular weight for JEFFAMINE® XTJ-507 (M-2005) is about 2005.

The polyoxyalkylene diamines may include amine terminated polyoxyalkylene diols. The polyether backbone for these polyoxyalkylene diols can include ethylene oxide, propylene oxide, butylene oxide, or mixtures thereof. In one example, the polyoxyalkylene diamine is triethyleneglycol diamine, which has the formula $H_2NCH_2CH_2OCH_2CH_2OCH_2CH_2NH_2$. One such suitable commercially available diamine is JEFFAMINE® XTJ-504. In another example, the polyoxyalkylene diamine may be defined by the general formula $H_2N(CH_2CH_2OCH_2CH_2OCH_2CH_2NH)_nH$, where n can be from 1 to 4. In one example, n equals about 2. One such suitable commercially available polyoxyalkylene diamine is JEF-FAMINE® XTJ-512. In another example, the polyoxyalkylene diamine may be defined by the general formula $H_2NCH(C_2H_5)CH_2(OCH(C_2H_5)CH_2)_nNH_2$ wherein n may be from about 1 to about 30. In one example, n is about 27. One such suitable polyoxyalkylene diamine is JEFFAMINE® XTJ-523.

The polyoxyalkylene diamine may further be defined by the general formula $H_2NCH(CH_3)CH_2O(CH_2CH(R)O)_nCH_2CH(CH_3)NH_2$, wherein R in each $CH_2CH(R)O$ unit is either H, forming an ethylene oxide unit, or $CH_3$, forming a propylene oxide unit, and n may be from about 1 to about 70. In one example, n is from 1 to 2 and R is $CH_3$. One such suitable commercially available polyoxyalkylene diamine is JEFFAMINE® D-230. In another example, n is from 4 to 5 and R is $CH_3$. One such suitable commercially available polyoxyalkylene diamine is JEFFAMINE® D-400. In another example, n is about 32 and R is $CH_3$. One such suitable commercially available diamine is JEFFAMINE® D-2000. In yet another example, n is about 41 and R is H. One such suitable commercially available diamine is JEFFAMINE® XTJ-502. In still another example, n is 2 and R is H. One such suitable commercially available polyoxyalkylene diamine is JEFFAMINE® XTJ-511.

The polyoxyalkylene triamines similarly can be ethylene, propylene, or butylene oxide based, or mixtures thereof and may be prepared by reaction thereof with a triol initiator, e.g., glycerin or trimethylolpropane, followed by amination of the terminal hydroxyl groups. Accordingly, the polyoxyalkylene triamine may include, in one embodiment, a triamine defined by the following structure:

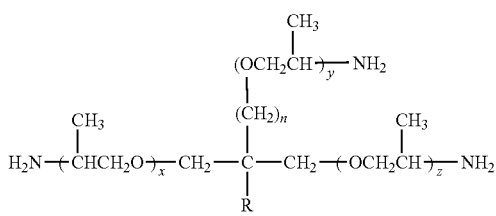

where R may be, e.g., H, $CH_3$, or $C_2H_5$; n may be 0 or 1; and x, y, and z individually may be from 1 to about 40 so as to provide a desired number of oxide units. In one example, n is 1, R is $C_2H_5$, and the number of total propylene oxide units (x+y+z) is from about 5 to about 6. One such suitable commercially available polyoxyalkylene triamine is JEFFAMINE® T-403. In another example, n is 0, R is H, and the number of total propylene oxide units (x+y+z) is about 85. One such suitable commercially available polyoxyalkylene triamine is JEFFAMINE® T-5000. In yet another example, n is 0, R is H, and the number of total propylene oxide units (x+y+z) is about 50. One such suitable commercially available polyoxyalkylene triamine is JEFFAMINE® XTJ-509.

The polyoxyalkylene amine generally is selected so that the solubility parameter thereof approximates the solubility parameter of the elastomer(s) in the rubber compound. By way of example, the solubility parameters of emulsion-polymerized styrene-butadiene rubber and solution-polymerized styrene-butadiene rubber typically are about 8.4 and 8.2 $cal^{1/2}cm^{3/2}mol^{-1}$, respectively. Therefore, in one example, the polyoxyalkylene amine(s) solubility parameter may be from about 8.6 to about 12 $cal^{1/2}cm^{3/2}mol^{-1}$. In another example, the polyoxyalkylene amine solubility parameter may be from about 8.6 to about 10 $cal^{1/2}cm^{3/2}mol^{-1}$. In yet another example, the polyoxyalkylene amine solubility parameter may be from about 8.6 to about 9 $cal^{1/2}cm^{3/2}mol^{-1}$.

The polyoxyalkylene amine(s) is present in the rubber compound in a total amount of from about 2 phr to about 10 phr. In another example, the polyoxyalkylene amine(s) is present in a total amount of from about 4 phr to about 8 phr. In yet another embodiment, the polyoxyalkylene amine(s) is present in a total amount of about 6 phr.

The rubber compound may further include epoxidized soybean oil (ESO), as is known to those having ordinary skill in the art. In one example, the epoxidized soybean oil is PLAS-THALL™ ESO available from C.P. Hall Company of Chicago, Ill. The epoxidized soybean oil may be present in the rubber compound in an amount from about 1 phr to about 10 phr. In another example, the epoxidized soybean oil may be present in an amount from about 3 phr to about 8 phr. In yet another example, the epoxidized soybean oil may be present in an amount of about 5 phr.

Additional additives known in the art may be provided in the rubber compound to provide a desired compound having desired physical properties. Such known and commonly used additive materials are activators, retarders and accelerators, rubber processing oils, resins including tackifying resins, plasticizers, fatty acids, zinc oxide, waxes, antidegradant, antiozonants, and peptizing agents. As known to those having ordinary skill in the art, depending on the intended use of the rubbers, the additives mentioned above are selected and used in conventional amounts.

Accordingly, in one embodiment of the present invention, the rubber compound includes a natural and/or synthetic elastomer, no less than about 20 phr silica filler, silane coupling agent present in an amount no more than 8% by weight of the silica, and about 2 phr to about 10 phr of at least one polyoxyalkylene amine. In another embodiment, the rubber compound further includes about 1 phr to about 10 phr epoxidized soy bean oil. In yet another embodiment, the rubber compound includes natural rubber, no less than about 20 phr silica filler, a silane coupling agent present in an amount no more than 8% by weight of the silica, and about 2 phr to about 10 phr of at least one polyoxybutylene amine of the formula $H_2NCH(C_2H_5)CH_2(OCH(C_2H_5)CH_2)_nNH_2$, where n may be from about 1 to about 30.

The mixing of the rubber compound can be accomplished by methods known to those having ordinary skill in the art. For example, the ingredients are typically mixed in at least two stages, namely, at least one non-productive stage followed by a productive mix stage. The final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the rubber mixing art.

The rubber compound of this invention can be used for various purposes, for example, in tires. Such tires can be built, shaped, molded and cured by various methods, which are known to those having ordinary skill in such art.

Non-limiting examples of rubber compounds for use in tires, and methods of making the compounds, in accordance with the present invention are disclosed below.

TABLE I

Rubber Compounds

| | Samples | | | |
|---|---|---|---|---|
| | A | B | C | D |
| First Stage (Non-Productive) | | | | |
| Solution SBR[1] | 65 | 65 | 65 | 65 |
| Cis-polybutadiene[2] | 30 | 30 | 30 | 30 |
| Natural rubber[3] | 5 | 5 | 5 | 5 |
| Silica[4] | 65 | 65 | 65 | 65 |
| Epoxidized soybean oil[5] | — | 5.2 | — | 5.2 |
| Bis-3-(triethoxysilylpropyl) tetrasulfide[6] | 5.2 | — | — | — |
| Microcrystalline wax | 0.7 | 0.7 | 0.7 | 0.7 |
| Antioxidant[7] | 0.75 | 0.75 | 0.75 | 0.75 |
| Aromatic Processing Oil[8] | 30 | 24 | 24 | 24 |
| Parafinic wax | 0.3 | 0.3 | 0.3 | 0.3 |
| Stearic acid | 1 | 1 | 1 | 1 |
| Polyoxyalkylene diamine[9] | — | 6 | 6 | 6 |
| Second Stage (Non-Productive) | | | | |
| Bis-3-(triethoxysilylpropyl) tetrasulfide[6] | — | 2.6 | 2.6 | — |
| Productive Stage | | | | |
| Sulfenamide accelerator | 1.5 | 1.5 | 1.5 | 1.5 |
| Sulfur | 1.88 | 2.19 | 2.19 | 2.5 |
| Zinc oxide | 2 | 2 | 2 | 2 |
| Paraphenylene diamine antidegradant | 0.75 | 0.75 | 0.75 | 0.75 |

[1]Solflex ™ from Goodyear Tire and Rubber
[2]Budene ™ from Goodyear Tire and Rubber
[3]SMR 20 Natural Rubber
[4]Zeosil ™ 1165 MP from Rhodia
[5]PLASTHALL ™ ESO from C.P. Hall Company
[6]Si69 ™ from Degussa
[7]Paraphenylene diamine type
[8]Highly aromatic staining process oil
[9]JEFFAMINE ® XTJ-523 from Huntsman Chemical - a polybutylene oxide diamine defined by $H_2NCH(C_2H_5)CH_2(OCH(C_2H_5)CH_2)_nNH_2$ wherein n is about 27

With reference to Table I, sample A is the control and is completely devoid of a polyoxyalkylene amine as well as epoxidized soybean oil. In the first non-productive mixing stage, components for the rubber compound for sample A were added together and mixed in a mixer in the amounts shown in Table I. The resulting mixture was mixed for three minutes at 140° C. In a second non-productive mixing stage, the mixture resulting from the first non-productive mix stage was again mixed for three minutes at 160° C. The productive-mix stage ingredients then were added to the mixture, in the amounts shown in Table I; and the ingredients were mixed for two minutes at 120° C. to produce the rubber compound of sample A.

With further reference to Table I, samples B, C and comparative sample D were prepared using the same processing parameters to those of sample A. In the first non-productive mix stage, each of the components of samples B, C, and D were combined in the amounts shown in Table I. In comparison to sample A, each of samples B, C, and D further included 6 phr JEFFAMINE® XTJ-523, which is a polybutylene oxide diamine having the formula $H_2NCH(C_2H_5)CH_2(OCH(C_2H_5)CH_2)_nNH_2$ [with n equal to about 27] and a solubility parameter of about 8.6. For desirable hysteresis characteristics, an additional 5.2 phr epoxidized soybean oil was further included in samples B and D with a comparable phr aromatic processing oil, which are known in the art, being eliminated in each of samples B and D, as well as sample C. Finally, comparative sample D was completely devoid of any silane coupling agent, i.e. bis-3-(triethoxysilylpropyl) tetrasulfide (TESPT), with no TESPT being added to either of samples B or C in the first non-productive mixing stage.

In the second non-productive mixing stage, 2.6 phr TESPT, which is half the amount contained in sample A, was added to samples B and C. Finally, in the third productive mixing stage, the sulfur was added so that each sample contained an equivalent amount taking into account the sulfur that was present in the silane coupling agent. Accordingly, sample A, which contains more TESPT, required the addition of less sulfur during the third productive mixing stage while the samples containing less TESPT required the addition of more sulfur. As a result, 1.88 phr sulfur was added to sample A, 2.19 phr sulfur was added to each of samples B and C, and 2.5 phr sulfur was added to sample D in the productive stage.

TABLE II

Test data

| | Samples | | | |
|---|---|---|---|---|
| | A | B | C | D |
| MDR[A] 150° C. | | | | |
| S' Max - S' Min dNm | 12.29 | 14.61 | 15.87 | 21.7 |
| S" @ S' Min dNm | 1.71 | 1.63 | 1.86 | 2.9 |
| S" @ S' Max dNm | 1 | 0.77 | 1.4 | 7.29 |
| S' Max dNm | 15.17 | 17.39 | 19.14 | 25.35 |
| S' Min dNm | 2.88 | 2.78 | 3.27 | 3.65 |
| Cure Time TC 2 (min) | 0.46 | 0.5 | 0.5 | 0.12 |
| Cure Time TC 10 (min) | 5.07 | 6.41 | 6.22 | 2.25 |
| Cure Time TC 20 (min) | 9.19 | 9.27 | 8.68 | 12.73 |
| Cure Time TC 25 (min) | 10.59 | 10.03 | 9.29 | 14.41 |
| Cure Time TC 50 (min) | 16.23 | 12.65 | 11.47 | 20.13 |
| Cure Time TC 90 (min) | 39.33 | 31.98 | 25.53 | 42.17 |
| Scorch Time TS 1 (min) | 3.08 | 3.21 | 2.55 | 0.21 |
| Scorch Time TS 2 (min) | 8.01 | 7.82 | 7.2 | 1.42 |
| Scorch Time TS 5 (min) | 14.18 | 11.09 | 9.94 | 13.84 |
| Tensile Modulus[B] (Mpa) | | | | |
| 100% | 1.457 | 1.278 | 1.645 | 1.018 |
| 300% | 4.497 | 4.797 | 6.437 | 2.12 |
| Tensile Strength (Mpa) | 17.67 | 17.35 | 16.64 | 12.67 |
| Elongation (%) | 761 | 711 | 595 | 917 |
| RPA Data[C] | | | | |
| Uncured G', 15% Strain, 100° C., 0.833 Hz | 285.74 | 242.68 | 301.04 | 301.04 |
| G', 1% Strain, 100° C., 1 Hz, kPa | 2895.5 | 2534.2 | 3479.9 | 2954 |
| G', 10% Strain, 100° C. 1 Hz, kPa | 1857.1 | 1380.2 | 2033.2 | 1501.8 |
| Tan δ, 10% Strain, 100° C., 1 Hz | 0.14 | 0.18 | 0.144 | 0.21 |

[A]Data obtained according to the Rheometer MDR2000 ™ instrument by Alpha Technologies.
[B]Data obtained according to ASTM D412-98a.
[C]Data obtained according to Rubber Process Analyzer RPA2000 ™ instrument by Alpha Technologies.

With reference to Table II, the experimental results show that samples B and C, overall, performed better than the control sample A and comparative sample D. For example, the cure time at 90 minutes for both samples B and C was better, i.e., shorter, than control sample A and comparative sample D. Notably, the cure time at 90 minutes for comparative sample D was the longest of all of the samples. In addition, the tensile modulus of sample C at both 100% and 300%, and the 300% modulus of sample B were greater than that of sample A. In further comparison, the tensile modulus of sample D at both 100% and 300% was the worst, i.e., lowest, of all of the samples. Furthermore, the cured stiffness, G', at 10% was greater for sample C than for sample A, yet, the cured Tan δ for samples C and A was equal. The cured Tan δ is indicative of the rolling resistance of the compound when manufactured into a tire, with a lower value indicating lower rolling resistance and, thus, better fuel economy. While the cured Tan δ of sample B was marginally higher than sample A, sample B had a lower cured stiffness at 1% (and 10%) strain than sample A. The stiffness at 1% strain is indicative of the dispersion of the silica filler with a lower value indicating better dispersion and, thus, better treadwear. Also, sample B had a lower uncured stiffness than control sample A with sample C having a slightly higher uncured stiffness than sample A. The lower uncured stiffness of sample B is an indicator of easier processability of the compound. Of particular interest, the Tan δ and uncured stiffness of sample D was the worst, i.e., the highest, of all of the samples.

The test results for comparative sample D help illustrate that a lower amount of silane coupling agent in combination with either the polyoxyalkylene amine (sample C) or the polyoxyalkylene amine and optional epoxidized soybean oil (sample B) can provide an acceptable balance of desirable properties in these rubber compounds. Accordingly, the amount of silane coupling agents in rubber compounds, which generally are currently used in high quantities to both disperse a silica filler and to couple the silica filler to an elastomeric polymer, may be effectively reduced therein by incorporating a polyoxyalkylene amine without substantially sacrificing performance characteristics.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the scope of the inventors' general inventive concept.

What is claimed is:

1. A rubber compound comprising:
   100 parts of an elastomer selected from the group consisting of polybutadiene, polyisoprene, natural rubber, isoprene-butadiene copolymer, emulsion polymerized styrene-butadiene, solution-polymerized styrene-butadiene rubber, and combinations thereof, wherein the elastomer is the total elastomer of the rubber compound;
   silica;
   a silane coupling agent;
   at least one polyoxyalkylene amine defined by a primary or secondary amino group attached to the terminus of a polyether backbone; and
   epoxidized soybean oil.

2. The rubber compound of claim 1 wherein the at least one polyoxyalkylene amine is defined by a primary amino group attached to the terminus of a polyether backbone.

3. The rubber compound of claim 1 wherein the polyoxyalkylene amine is selected from the group consisting of a polyoxyalkylene monoamine, a polyoxyalkylene diamine, and a polyoxyalkylene triamine.

4. The rubber compound of claim 1 wherein the polyoxyalkylene amine is a polyoxyalkylene diamine.

5. The rubber compound of claim 3 wherein the polyoxyalkylene amine is a polyoxyalkylene diamine defined by $H_2NCH(C_2H_5)CH_2(OCH(C_2H_5)CH_2)_nNH_2$ wherein n is from 1 to about 30.

6. The rubber compound of claim 4 wherein the silane coupling agent is a bis (ω-trialkoxyalkylsilyl) polysulfide, a ω-mercaptoalkyl-trialkoxysilane, or combinations thereof.

7. The rubber compound of claim 1 wherein the polyether backbone is defined by alkylene oxide groups selected from the group consisting of propylene oxide (PO), ethylene oxide (EO), butylene oxide (BO), and mixtures thereof.

8. A tire comprising the rubber compound of claim 1.

9. The rubber compound of claim 1 comprising:
   no less than 20 phr silica;
   the silane coupling agent present in an amount no more than 8% by weight of silane coupling agent based on the weight of silica;
   about 2 phr to about 10 phr of the at least one polyoxyalkylene amine; and
   about 1 phr to about 10 phr epoxidized soybean oil.

10. The rubber compound of claim 9 wherein the silane coupling agent is present in an amount less than 6% by weight of silica.

11. The rubber compound of claim 9 wherein the silane coupling agent is present in an amount less than 4% by weight of silica.

12. The rubber compound of claim 9 wherein the polyoxyalkylene amine is present in a total amount of from about 4 phr to about 8 phr.

13. The rubber compound of claim 9 wherein the silica is present in an amount from about 40 phr to about 80 phr, the silane coupling agent is present in an amount no more than 6% by weight of the silica, and the polyoxyalkylene amine is a polyoxyalkylene diamine present in an amount from about 4 phr to about 8 phr.

14. The rubber compound of claim 13 wherein the polyoxyalkylene diamine is $H_2NCH(C_2H_5)CH_2(OCH(C_2H_5)CH_2)_nNH_2$, wherein n is from 1 to about 30.

15. The rubber compound of claim 13 wherein the epoxidized soybean oil is present in an amount from about 3 phr to about 8 phr.

16. A rubber compound comprising:
   a natural elastomer, a synthetic elastomer, or combinations thereof;
   silica;
   a silane coupling agent; and
   at least one polyoxyalkylene diamine defined by $H_2NCH(C_2H_5)CH_2 (OCH(C_2H_5)CH_2)_nNH_2$, wherein n is from 1 to about 30.

17. The rubber compound of claim 16 comprising:
   100 phr of the natural elastomer, synthetic elastomer, or combinations thereof;
   no less than 20 phr silica;
   the silane coupling agent present in an amount no more than 8% by weight of silane coupling agent based on the weight of silica; and
   about 2 phr to about 10 phr of the at least one polyoxyalkylene diamine.

18. The rubber compound of claim 16 wherein the silane coupling agent is present in an amount less than 6% by weight of silica.

19. The rubber compound of claim 18 wherein the silane coupling agent is present in an amount less than 4% by weight of silica 20. A tire comprising the rubber compound of claim 16.

* * * * *